(12) United States Patent
Gebhardt et al.

(10) Patent No.: US 10,626,945 B2
(45) Date of Patent: Apr. 21, 2020

(54) VIBRATION ABSORBER HAVING AN ABSORBER MASS WITH LIMITED DEFLECTION AMPLITUDE

(71) Applicant: WEGU GmbH Schwingungsdaempfung, Kassel (DE)

(72) Inventors: Willi Gebhardt, Kassel (DE); Sebastian Glampke, Kaufungen (DE); Horst Zimmermann, Kaufungen (DE)

(73) Assignee: WEGU GMBH SCHWINGUNGSDAEMPFUNG, Kassel (DE)

( * ) Notice: Subject to any disclaimer, the term of this patent is extended or adjusted under 35 U.S.C. 154(b) by 69 days.

(21) Appl. No.: 15/915,107

(22) Filed: Mar. 8, 2018

(65) Prior Publication Data
US 2018/0274619 A1 Sep. 27, 2018

(30) Foreign Application Priority Data
Mar. 21, 2017 (DE) .......................... 10 2017 106 019

(51) Int. Cl.
*F16F 7/108* (2006.01)
*F16F 1/373* (2006.01)
(52) U.S. Cl.
CPC ............ *F16F 7/108* (2013.01); *F16F 1/3732* (2013.01); *F16F 2224/025* (2013.01)
(58) Field of Classification Search
CPC .......... F16F 7/108; F16F 7/104; F16F 1/3732; F16F 2224/025; F16F 15/1442; F16F 15/145; F16F 15/1457; B25D 17/24; B25D 2217/0092; Y10S 173/02
See application file for complete search history.

(56) References Cited

U.S. PATENT DOCUMENTS

| 4,207,957 A * | 6/1980 | Sivers ................... B60K 17/22 180/380 |
| 4,385,665 A | 5/1983 | Knoll |
| 2006/0012090 A1 | 1/2006 | Cerri et al. |

(Continued)

FOREIGN PATENT DOCUMENTS

| DE | 2139192 A1 * | 2/1973 | ......... B27B 17/0033 |
| DE | 2302732 A1 * | 7/1973 | ........... B23B 29/022 |

(Continued)

*Primary Examiner* — Xuan Lan Nguyen
(74) *Attorney, Agent, or Firm* — Thomas | Horstemeyer, LLP

(57) ABSTRACT

A vibration absorber for reducing vibrations of a structure comprises a rigid solid body providing an absorber mass, and two spring elements for elastically coupling the absorber mass to the structure. The spring elements are arranged at opposing ends of the absorber mass, and each of the two spring elements comprises a tube-shaped section made of elastomeric material which is positively connected to the rigid solid body and which extends away from the rigid solid body up to a fixation contour at its outer circumference. Each of the fixation contours is configured for fixation in an opening of a mounting base of the structure. A pin-shaped amplitude delimiter which is part of the rigid solid body is arranged in each of the two tube-shaped sections for delimiting amplitudes of deflections of the absorber mass with regard to the structure.

14 Claims, 3 Drawing Sheets

(56) References Cited

U.S. PATENT DOCUMENTS

2015/0337916 A1*  11/2015  Cerri ..................... F16F 7/108
                                                             188/379
2019/0186577 A1    6/2019  Back et al.

FOREIGN PATENT DOCUMENTS

| DE | 30 38 711 A1 | 5/1981 | |
|----|---|---|---|
| DE | 36 32 418 A1 | 3/1988 | |
| DE | 3630870 A1 * | 3/1988 | ........... B23D 47/005 |
| DE | 10 2011 008 339 A1 | 7/2012 | |
| DE | 102013104034 A1 * | 10/2014 | .............. F16F 15/08 |
| EP | 0408040 A1 * | 1/1991 | .......... F16F 15/1442 |
| EP | 0519301 A1 * | 12/1992 | .............. B41F 13/08 |
| EP | 1 303 710 B1 | 9/2004 | |

* cited by examiner

VIBRATION ABSORBER HAVING AN ABSORBER MASS WITH LIMITED DEFLECTION AMPLITUDE

CROSS REFERENCE TO RELATED APPLICATIONS

This utility patent application claims priority to German patent application DE 10 2017 106 019.7 filed on Mar. 21, 2017 and entitled "Schwingungstilger mit Auslenkungsbegrenzern für seine an zwei Enden elastisch gelagerte Tilgermasse".

FIELD

The invention relates to a vibration absorber for reducing vibrations of a structure, the vibration absorber comprising an absorber mass and two elastic elements at two opposing ends of the absorber mass, which are configured for elastically coupling the absorber mass to the structure. Further, the present invention relates to a vibration absorption apparatus including such a vibration absorber.

PRIOR ART

Vibration absorbers can be used for reducing vibrations of different structures. Many vibration absorbers are found in motor vehicles. Here, the vibration absorbers may, for example, reduce vibrations of doors and lids. These vibrations have comparatively low frequencies of, for example, less than 100 Hz. To tune a vibration absorber with its absorber eigen frequency to such a low vibration frequency, the physical mass of its absorber mass has to be comparatively high and the stiffness of the elastic coupling of its absorber mass to the structure has to be comparatively low. As a result, the vibration absorber becomes sensitive with regard to an impulse load as it occurs in slamming the door or lid. When the door or lid reaches its closed position, its structure is quickly decelerated. The absorber mass, however, moves on in the closing direction of the door or lid unit it is decelerated via its elastic coupling. Here, there are the dangers that the elastic elements are overstretched and that the absorber mass hits the structure in an uncontrolled way. The same dangers occur again when the structure has been accelerated by the tensioned elastic elements in a direction opposite to the closing direction of the respective door or lid with regard to the structure and is then once again decelerated by the elastic elements.

German patent application publication DE 10 2011 008 339 A1 discloses a vibration absorber for a vehicle part, particularly a body part like a luggage compartment lid or engine hood, of a motor vehicle. The known vibration absorber comprises an essentially rectangular absorber plate made of metal and having two depressions. One of two elastomeric springs of an elastic spring arrangement is arranged in each of the two depressions and covered by a circular retaining element for the absorber plate. Each of the elastomeric springs is, on the one hand, connected to an outer armature pressed into the absorber plate and, on the other hand, to an inner armature connected to a mounting plate. The elastomeric material of the respective elastomeric spring forms a bulge at that side of the outer armature facing towards the mounting plate, which serves as a buffer stop for a movement of the absorber plate in the direction towards the mounting plate. Further, the elastomeric material of the respective elastomeric spring forms a ring-shaped elastomeric stop which buffers a vibration movement of the absorber plate in the direction away from the mounting plate delimited by the retaining element. The retaining element is cup-shaped and protrudes over the absorber plate in the direction away from the mounting plate. The elastomeric stop stopping the absorber plate, however, is arranged in the respective depression of the absorber plate. The integrated retaining element avoids that the absorber plate, in case of a failure of the elastomeric spring, freely moves through the vehicle structure and causes beating sounds surprising the driver or damages other components of the vehicle. Further, it protects against overloading the elastomeric spring. In the opposite spatial direction, overloading the elastomeric spring is avoided by the absorber plate being stopped by the elastomeric bulge at the mounting plate. The known vibration absorber has a complex multipart construction and is quite expensive as a consequence.

European patent description EP 1 303 710 B1 discloses a vibration absorber comprising several spring elements made of elastomeric material and an absorber mass. The spring elements have first form grip elements for gripping a mounting base and second form grip elements for gripping the absorber mass. Each of the first and second form grip elements has a recess with gripping surfaces for transferring vibrations. Each of the spring elements has a cavity pointing inwards and forming an opening at the base of the respective spring element. A tuning core is inserted into this cavity. The tuning core fills the cavity either completely or incompletely, and it has a suitable stiffness to influence the deformations of the spring element due to vibrations of the absorber mass. The tuning core may be stiffer or less stiff than the spring element. With an absorber mass in form of a square plate, one spring element is arranged in each corner of the square. Each spring element, with its first form grip elements, is secured within a borehole in the absorber mass, the borehole running orthogonal through the plate. With the second form grip elements, the respective spring element is anchored in an aligned borehole in the mounting base. The spring elements of this known vibration absorber may be manufactured separately from the absorber mass. In exchange, mounting the vibration absorber inclusive of inserting the tuning cores into the cavities of the spring elements is laborious. Further, this known vibration absorber is not specifically suited for reducing vibrations of a door or lid which typically occur in a direction orthogonal to a direction of main extension of the door or lid.

German patent application publication DE 36 32 418 A1 discloses an arrangement for vibration reduction of a hollow driveshaft of a motor vehicle. The driveshaft includes an elastically deformable body consisting of two mirror-symmetric partial bodies made of an elastic material, like for example hard rubber. A tension rod comprising a threaded hole with a screw at each of its end extends through the elastically deformable body. The heads of the screws act upon support plates which cover the ends of the elastically deformable body. Upon tightening the screws, the support plates compress the elastically deformable body, which in turn increases in diameter so that it is pressed against the inner wall of the driveshaft. The cylindrical middle section of the tension rod has an increased diameter. Due to this increased diameter, the physical mass of the damping mass of the elastically deformable body is increased.

US 2006/0012090 A1 discloses a multi-dimensionally tuned vibration absorber in which a ring-shaped absorber mass extends around a bolt and in which an elastomeric bushing is arranged between the bolt and the absorber mass. The elastomeric bushing is chemically connected to both the absorber mass and the bolt.

German patent application publication DE 30 38 711 A1 (corresponding to U.S. Pat. No. 4,385,665 A) discloses an apparatus for absorbing kinetic energy comprising two coaxially arranged bodies and connection means between the two bodies. Notches are provided in the opposing walls of the outer body and the inner body, and a roller made of a compressible solid material is arranged within the notches. The compressible solid material of the roller is an elastomeric material. There still is a need of a vibration absorber which is particularly suited for reducing vibrations of doors and lids and which may nevertheless be produced at low cost.

SUMMARY

The invention relates to a vibration absorber for reducing vibrations of a structure. The vibration absorber comprises a rigid solid body providing an absorber mass, and two spring elements configured for elastically coupling the absorber mass to the structure. The spring elements are arranged at opposing ends of the absorber mass, and each of the two spring elements comprises a tube-shaped section made of elastomeric material which is positively connected to the rigid solid body and which extends away from the rigid solid body up to a fixation contour at its outer circumference. The fixation contour is configured for fixation in an opening of a mounting base of the structure. A pin-shaped amplitude delimiter configured for delimiting amplitudes of deflections of the absorber mass with regard to the structure is arranged in each of the two tube-shaped sections, and the two pin-shaped amplitude delimiters are part of the rigid solid body.

Further, the invention relates to a vibration absorption apparatus comprising a mounting base including a shaped sheet metal body; and a vibration absorber including a rigid solid body providing an absorber mass, and two spring elements arranged at opposing ends of the absorber mass. The shaped sheet metal body has two parallel areas. Each of the two parallel areas is provided with an opening. Each of the two spring elements comprises a tube-shaped section made of elastomeric material which is positively connected to the rigid solid body and which extends away from the rigid solid body up to a fixation contour at its outer circumference. Each of the fixation contours is fixed in one of the two openings of the mounting base. A pin-shaped amplitude delimiter for delimiting amplitudes of deflections of the absorber mass with regard to the mounting base is arranged in each of the two tube-shaped sections. The two pin-shaped amplitude delimiters are part of the rigid solid body.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
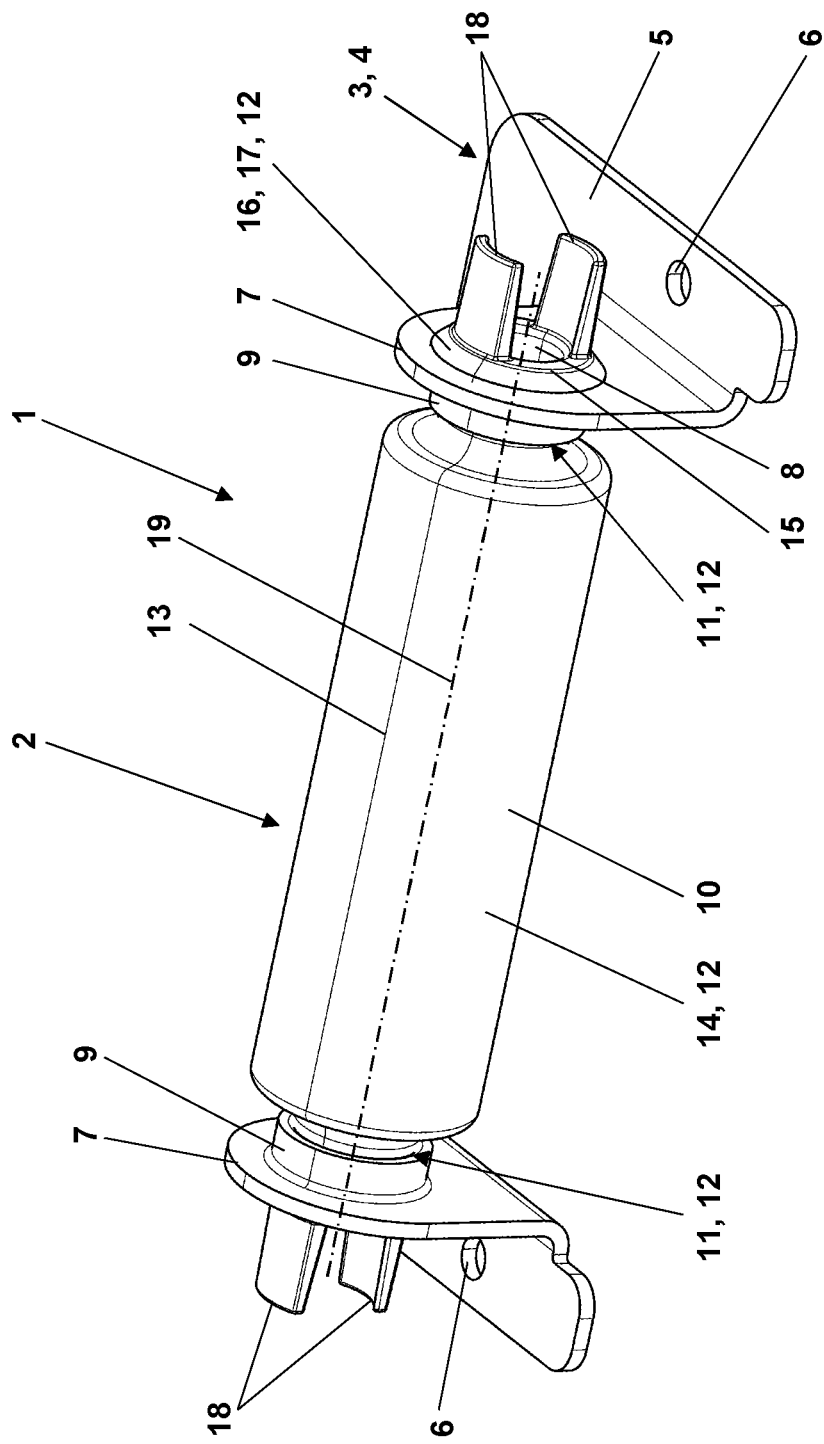
FIG. 1 shows a vibration absorber apparatus according to the invention in a perspective view.

A vibration absorber according to the invention for reducing vibrations of a structure comprises an absorber mass and two spring elements arranged at opposing ends of the absorber mass for elastically coupling the absorber mass to the structure. Each of the two spring elements comprises a tube-shaped section made of elastomeric material extending away from the absorber mass up to a fixation contour at its outer circumference which is designed for fixation in an opening of a mounting base of the structure. A pin-shaped amplitude delimiter is arranged in each of the two tube-shaped sections. The two amplitude delimiters delimit amplitudes of deflections of the absorber mass with regard to the structure. According to the invention, the two tube-shaped sections made of the elastomeric material are positively jointed to the absorber mass, and the two pin-shaped amplitude delimiters are parts of a rigid solid body providing the absorber mass. For example, the rigid solid body providing the absorber mass and including the pin-shaped amplitude delimiters may be made by metal casting and optional material-removing post-processing of a cast metal body; and the elastomeric material for forming the two tube-shaped sections may be vulcanized to this rigid solid body around the pin-shaped amplitude delimiters.

In case of vibrations of the absorber mass with regard to the structure, the tube-shaped sections of the spring elements are deformed. These deformations increasing with the amplitude of the vibrations of the absorber mass are delimited by the rigid amplitude delimiters. Typically, the amplitude delimiters extend into the tube-shaped sections with play in all radial directions so that they do not have an influence on the stiffness of the spring elements with smaller amplitudes of the vibrations of the absorber mass with regard to the mounting base. If, however, the pin-shaped amplitude delimiters, with a higher amplitudes of the vibrations of the absorber mass with regard to the mounting base, strike against the inner surfaces of the tube-shaped sections of the spring elements, they become effective in the sense of a strong increase in the stiffness of the elastic coupling, and, thus, they delimit the amplitudes of the deflections of the absorber mass with regard to the mounting base. The increase of the stiffness of the elastic coupling of the absorber mass to the mounting base when the pin-shaped amplitude delimiters strike against the inner surfaces of the tube-shaped sections of the spring elements is particularly steep, because the pin-shaped amplitude delimiters are rigid parts of the absorber mass. Due to the fact that the pin-shaped amplitude delimiters are no separate parts, the overall number of parts of the vibration absorber according to the invention is only small.

The radial play of the amplitude delimiters in the tube-shaped sections may be equal, i.e. the same, in all radial directions. Alternatively, the radial play may have a predetermined distribution around the amplitude delimiters so that a function of the amplitude delimiters depends on the direction of the deflections of the absorber mass with regard to the mounting base. For this purpose, the amplitude delimiters and/or the interior of the tube-shaped sections may have a shape deviating from a cylinder.

Generally, the tube-shaped sections may, except of the fixation contours, essentially have the shape of cylinder jackets. Alternatively, they may, for example, have an oval cross section or a wall thickness varying in circumferential direction. With a noncircular design of the tube-shaped sections, the fixation contours and the associated openings in the mounting base are typically also not circular but reflect the noncircular cross section of the tube-shaped sections.

The pin-shaped amplitude delimiters may extend over the entire axial length of the tube-shaped sections of the spring elements and, in principle, also up into the openings of the mounting base. This, however, proves not to be necessary. Even clearly shorter amplitude delimiters fulfil their function. Thus, the pin-shaped amplitude delimiters may end at an axial distance to the fixation contours which are formed at the outer circumference of the tube-shaped sections. Depending on their length, the amplitude delimiters may, however, also have a captive function which secures the absorber mass to the mounting base even upon failure of one or both spring elements.

The vibration absorber according to the invention is particularly adapted to the task of reducing vibrations of a door or lid orthogonal to its plane of main extension, if the two tube-shaped sections of its two spring elements and the amplitude delimiters arranged therein are arranged coaxially with regard to a main axis. This particularly applies if the absorber mass is elongated between its two ends along this main axis.

The elastomeric material of the spring elements may enclose the rigid solid body providing the absorber mass in between the two spring elements. Thus, on the one hand, a an anticorrosive coating for the rigid solid body and, on the other hand, an all-side stopping buffer for the absorber mass is provided in case of stronger deflections of the absorber mass with regard to the mounting base.

The fixation contours at the outer circumferences of the tube-shaped sections may each comprise a fixation flange having a supporting surface pointing towards the absorber mass. Generally, the fixation contours may also have a further fixation flange having a supporting surface pointing away from the absorber mass so that a fixation notch for fixing the respective spring element to the mounting base is formed between these two supporting surfaces. None of the two fixation flanges needs to run around the entire tube-shaped section.

Particularly with a coaxial arrangement of the two spring elements at opposing ends of the absorber mass, the spring elements fixed to the mounting base may be under a pretension which holds the respective supporting surface in direct contact to the mounting base so that no further, oppositely oriented supporting surface is needed. This also makes the fixation of the spring elements to the mounting base easier, as it is sufficient to bring the spring elements into the respective opening to such an extent that the fixation flange gets behind the corresponding counter surface of the mounting base. There is no need to care for that the mounting base engages a circumferential notch of the respective fixation contour.

In order to make fixing the spring elements to the mounting base easier, each of the two tube-shaped sections may turn into two parallel and circumferentially separated mounting aids also made of the elastomeric material. These fastening elements may be pulled through the respective opening in the mounting base until the fixation contours fix the spring elements to the mounting base. The two fastening elements may be pressed together and thus easily be gripped together with by hand or a tool.

In a vibration absorption apparatus according to the invention comprising a mounting base and a vibration absorber according to the invention, the vibration absorber is fixed with the fixation contours of the tube-shaped sections of its spring elements in openings of the mounting base. The openings are formed in two parallel areas of a formed or shaped sheet metal body. This shaped sheet metal body may be part of the structure whose vibrations are to be reduced or it may be rigidly coupled thereto, like for example screwed thereto.

In a preferred embodiment of the vibration absorption apparatus according to the invention, support plates of the shaped sheet metal body extend away from rims of the openings over a part of the tube-shaped sections. Particularly, the support plates, from a point of view of the tube-shaped sections, are arranged in two opposing main deflection directions of the absorber mass. The amplitude delimiters strike against these support plates with the elastomeric material of the tube-shaped sections being arranged in between. If the support plates only extend in the two opposing main deflection directions of the absorber mass over the tube-shaped sections, they at most very little hinder the fixation of the spring elements to the mounting base. In the two opposing main deflection directions of the absorber mass, they, however, provide for an essential increase of stiffness of the elastic coupling and for a corresponding stopping of the absorber mass as soon as it is deflected with regard to the mounting base beyond a certain minimum value.

Particularly, the two opposing directions of main deflection of the absorber mass may be the closing and opening directions of a door or lid whose structure is the structure whose vibrations are reduced by the vibration absorber according to the invention. It is sufficient, if the support plates only extend over a part of the tube-shaped sections in axial direction. The support plates may be provided by bending the formed or shaped sheet metal body in forming the openings of the mounting base.

Figure 2:
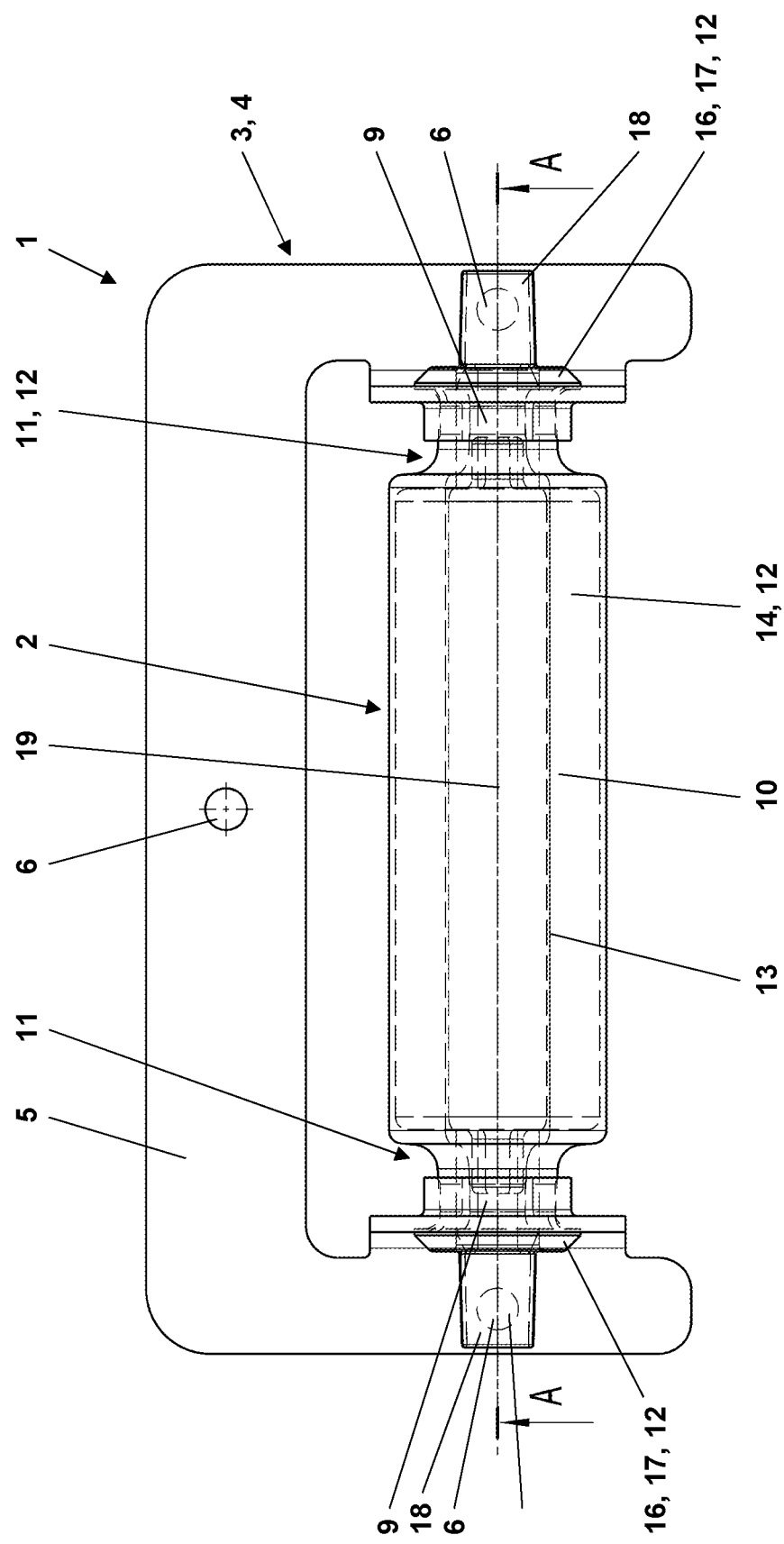
FIG. 2 is a plane view on the vibration absorber apparatus according to FIG. 1.
Figure 3:
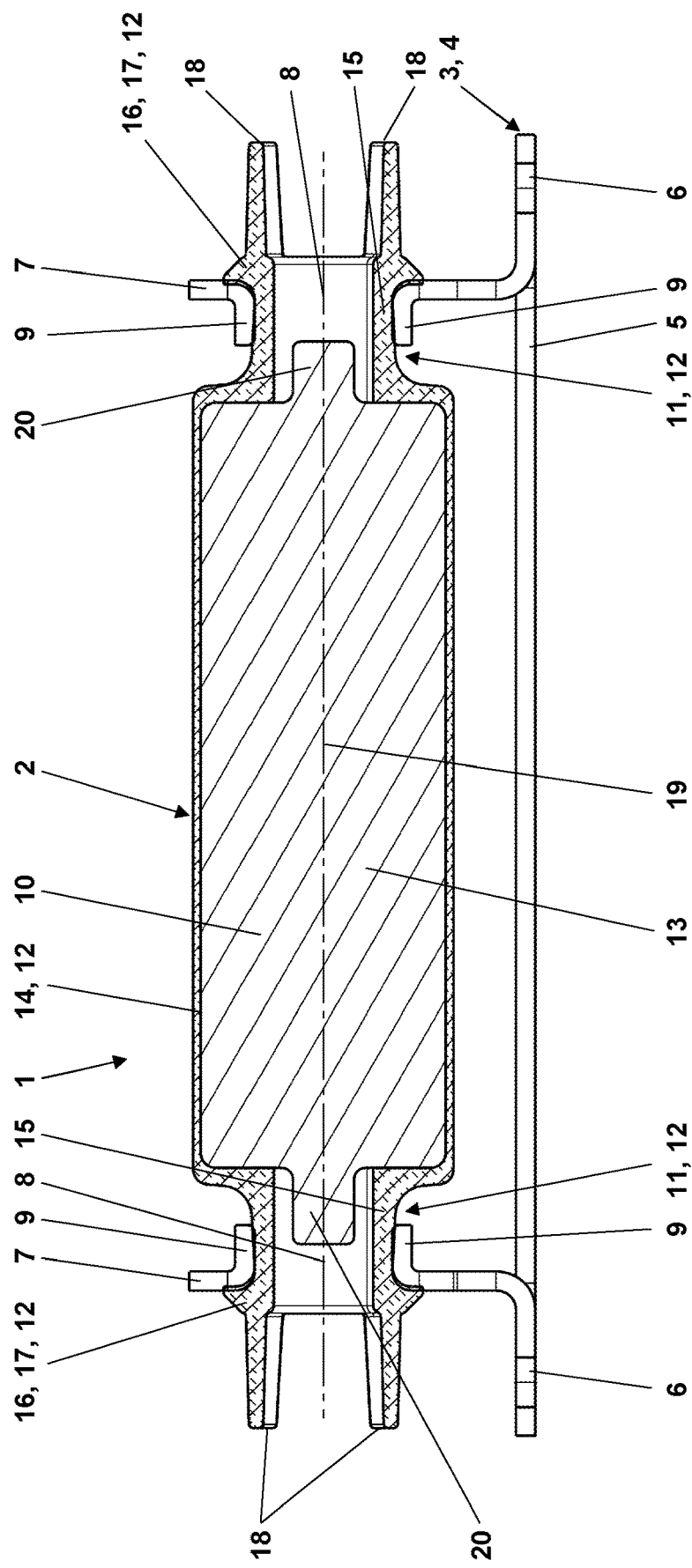
FIG. 3 is a section along a main axis of the vibration absorber apparatus according to FIGS. 1 and 2 along an intersecting line A-A depicted in FIG. 2.

Now referring in greater detail to the drawings, the vibration absorption apparatus 1 according FIGS. 1 to 3 includes a vibration absorber 2 for reducing vibrations of a structure, particularly of a door or lid of a motor vehicle. A mounting base 3 is to be rigidly coupled to this structure which is not depicted here itself. Alternatively, the mounting base 3 may be integrated into the structure. In any case, the mounting base 3 vibrates together with the structure. The mounting base 3 is a shaped sheet metal body 4 having a foot area 5 provided with at least one fixation hole 6. Two parallel areas 7 extend away from the foot area 5. In each of the parallel areas 7, an opening 8 is provided which is circular in the present embodiment of the vibration absorption apparatus 1. With regard to the depiction in FIG. 3, upper and lower horizontal support plates 9 extend away from a rim of the circular openings 8 towards the respective other area 7. An absorber mass 10 is elastically supported at or coupled to the mounting base 3 between the two areas 7. For this purpose, one spring element 11 made of elastomeric material 12 is arranged at each of the two ends of the elongated absorber mass 10. Particularly, the elastomeric material 12 is vulcanized to a rigid solid body 13 providing the absorber mass, the elastomeric material 12 also covering the rigid solid body 13 between the two ends of the absorber mass 10 with an anticorrosive coating 14. The spring elements 11 include tube-shaped sections 15 which extend up onto those sides of the openings 8 of the mounting base 3 which face away from the absorber mass 10. Here, at the outer circumference of the tube-shaped sections 15, fixation contours 16 are formed. The fixation contours 16 have the form of fixation flanges 17 made of the elastomeric material 12 which abut with supporting surfaces against the areas 7 from the outside at the rim of the openings 8. Behind the openings 8, the tube-shaped sections 15 turn into mounting aids 18 by which the spring elements may be pulled through the openings 8 until the fixation contours 16 snap with their fixation flanges 17 behind the areas 7 and then abut with a limited pretension in the direction of a main axis 19 against the areas 7. Mounting the absorber mass 10 with the spring elements 11 between the areas 7 is made easy in that the support plates 9 are only provided at the bottom and at the top and leave lateral clearances through which the tube shaped sections may be introduced.

The rigid solid body 13 of the absorber mass includes pin-shaped amplitude delimiters 20 which extend into the tube-shaped sections 15 with radial play in all radial directions. In the present embodiment, the amplitude delimiters 20 extend into the tube-shaped sections 15 only up to the free ends of the support plates 9. The arrangement of the amplitude delimiters 20 and the tube-shaped sections 15 into which the amplitude delimiters engage is coaxial with regard to the main axis 19. Together with the support plates 9 the pin-shaped amplitude delimiters 20 care for that the absorber mass 10, in the two vertical directions according to FIG. 3 corresponding to the opening and closing directions of the lid or door whose vibrations are to be reduced, is protected against too strong deflections with regard to the mounting base 3 as they may otherwise occur with a low frequency tuning of the vibrations absorber 2 in case of slamming the lid or door, for example. With small deflections or vibration amplitudes of the absorber mass 10 with regard to the mounting base 3, however, neither the amplitude delimiters nor the support plates 9 have an effect. The entire vibration absorption apparatus 1 according to FIGS. 1 to 3 consists of the shaped sheet metal body 4 of the mounting base 3, of the rigid solid body 13 of the absorber mass 10 which integrally forms the amplitude delimiters 20 and of the elastomeric material vulcanized to the rigid solid body 13 which forms the spring elements 11 up to the mounting aids 18.

Many variations and modifications may be made to the preferred embodiments of the invention without departing substantially from the spirit and principles of the invention. All such modifications and variations are intended to be included herein within the scope of the present invention, as defined by the following claims.

We claim:

1. A vibration absorber for reducing vibrations of a structure, the vibration absorber comprising:
   a rigid solid body providing an absorber mass, and
   two spring elements configured for elastically coupling the absorber mass to the structure, the spring elements being arranged at opposing ends of the absorber mass,
   wherein each of the two spring elements comprises a tube-shaped section made of elastomeric material which is positively connected to the rigid solid body and which extends away from the rigid solid body up to a fixation contour at its outer circumference, the fixation contour being configured for fixation in an opening of a mounting base of the structure,
   wherein a pin-shaped amplitude delimiter configured for delimiting amplitudes of deflections of the absorber mass with regard to the structure is arranged in each of the two tube-shaped sections,
   wherein the two pin-shaped amplitude delimiters are part of the rigid solid body
   wherein the tube-shaped section turn into mounting aids behind the fixation contours at their ends facing away from the rigid solid body, and
   wherein each of the two tube-shaped sections turns into two parallel mounting aids which are separated from each other in circumferential direction.

2. The vibration absorber of claim 1, wherein the pin-shaped amplitude delimiters extend into the tube-shaped sections with play in all radial directions.

3. The vibration absorber of claim 1, wherein the pin-shaped amplitude delimiters end at an axial distance to the fixation contours.

4. The vibration absorber of claim 1, wherein the two tube-shaped sections and the pin-shaped amplitude delimiters arranged therein are coaxially arranged with regard to a main axis.

5. The vibration absorber of claim 1, wherein the elastomeric material covers the rigid solid body between the spring elements.

6. The vibration absorber of claim 1, wherein each of the fixation contours at the outer circumferences of the tube-shaped sections comprises a fixation flange having a supporting surface pointing towards the rigid solid body.

7. A vibration absorption apparatus comprising
   a mounting base including a shaped sheet metal body, the shaped sheet metal body having two parallel areas, each of the two parallel areas being provided with an opening; and
   a vibration absorber including a rigid solid body providing an absorber mass, and two spring elements arranged at opposing ends of the absorber mass,
   wherein each of the two spring elements comprises a tube-shaped section made of elastomeric material which is positively connected to the rigid solid body and which extends away from the rigid solid body up to a fixation contour at its outer circumference, the fixation contour being fixed in one of the two openings of the mounting base,
   wherein a pin-shaped amplitude delimiter configured for delimiting amplitudes of deflections of the absorber mass with regard to the mounting base is arranged in each of the two tube-shaped sections,
   wherein the two pin-shaped amplitude delimiters are part of the rigid solid body,
   wherein the tube-shaped section turn into mounting aids behind the fixation contours at those sides of the two parallel areas facing away from the rigid solid body, and
   wherein each of the two tube-shaped sections turns into two parallel mounting aids which are separated from each other in circumferential direction.

8. The vibration absorption apparatus of claim 7, wherein the pin-shaped amplitude delimiters extend into the tube-shaped sections with play in all radial directions.

9. The vibration absorption apparatus of claim 7, wherein the pin-shaped amplitude delimiters end at an axial distance to the fixation contours.

10. The vibration absorption apparatus of claim 7, wherein the two tube-shaped sections and the pin-shaped amplitude delimiters arranged therein are coaxially arranged with regard to a main axis.

11. The vibration absorption apparatus of claim 7, wherein the elastomeric material covers the rigid solid body between the spring elements.

12. The vibration absorption apparatus of claim 7, wherein each of the fixation contours at the outer circumferences of the tube-shaped sections comprises a fixation flange having a supporting surface pointing towards the rigid solid body and abutting against the respective one of the two parallel areas.

13. The vibration absorption apparatus of claim 7, wherein the shaped sheet metal body includes support plates extending from rims of the openings in the parallel areas over a part of the tube-shaped sections.

14. The vibration absorption apparatus of claim 7, wherein the support plates, from a point of view of the tube-shaped sections, are arranged in two opposing main deflection directions of the absorber mass.

* * * * *